(12) United States Patent
Becker et al.

(10) Patent No.: US 6,676,119 B2
(45) Date of Patent: Jan. 13, 2004

(54) ADJUSTABLE SUSPENSION STRUT FOR A MOTOR VEHICLE AND METHOD OF ADJUSTING A SUSPENSION STRUT

(75) Inventors: Dietmar Becker, Tamm (DE); Thomas Garbe, Affalterbach (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/139,682

(22) Filed: May 7, 2002

(65) Prior Publication Data

US 2002/0171187 A1 Nov. 21, 2002

(30) Foreign Application Priority Data

May 15, 2001 (DE) .......................................... 101 23 491

(51) Int. Cl.[7] .............................................. B60G 17/08
(52) U.S. Cl. ...................... 267/218; 267/255; 267/177; 280/124.162
(58) Field of Search ................................. 267/218, 221, 267/225, 64.16, 64.17, 64.28, 255, 177; 188/322.16, 322.17, 322.19, 322.12; 280/6.157, 6.159, 124.101, 124.102, 124.162

(56) References Cited

U.S. PATENT DOCUMENTS

| | | | | |
|---|---|---|---|---|
| 2,756,045 A | * | 7/1956 | Savory | 267/218 |
| 3,542,387 A | * | 11/1970 | Schmid | 280/6.159 |
| 3,628,810 A | * | 12/1971 | Graef | 280/6.159 |
| 4,079,922 A | * | 3/1978 | Nicholls | 267/218 |
| 4,159,105 A | * | 6/1979 | Vander Laan et al. | 267/218 |
| 4,366,969 A | * | 1/1983 | Benya et al. | 267/221 |
| 4,830,395 A | * | 5/1989 | Foley | 280/124.162 |
| 5,009,451 A | * | 4/1991 | Hayashi et al. | 267/221 |
| 5,044,614 A | * | 9/1991 | Rau | 267/221 |
| 5,263,695 A | * | 11/1993 | Bianchi | 267/225 |
| 5,401,053 A | | 3/1995 | Sahm et al. | 267/218 |
| 5,803,443 A | * | 9/1998 | Chang | 267/221 |
| 5,823,517 A | | 10/1998 | Huang et al. | |
| 5,984,286 A | * | 11/1999 | Busch et al. | 267/218 |
| 6,155,545 A | * | 12/2000 | Noro et al. | 267/221 |

FOREIGN PATENT DOCUMENTS

| | | |
|---|---|---|
| DE | 4231641 A1 | 3/1994 |
| DE | 19529580 C2 | 2/1997 |
| JP | 58-161610 A * | 9/1983 |

* cited by examiner

*Primary Examiner*—Jack Lavinder
*Assistant Examiner*—Thomas J. Williams
(74) *Attorney, Agent, or Firm*—Crowell & Moring LLP

(57) ABSTRACT

An adjustable suspension strut for a motor vehicle includes a damping element enveloped by a spring, a first ring cylinder axially slidable relative to the damping cylinder, a second ring cylinder disposed between the damping cylinder and the first ring cylinder, a working chamber defined by at least the first and second ring cylinders, and an adjusting element configured to adjust the relative position between the damping element and one of the first and the second ring cylinders. The second ring cylinder is axially slidable relative to the damping cylinder. The second end of the spring is disposed on one of the ring cylinders. The two ring cylinders are axially displaced relative to each other.

8 Claims, 3 Drawing Sheets

ADJUSTABLE SUSPENSION STRUT FOR A MOTOR VEHICLE AND METHOD OF ADJUSTING A SUSPENSION STRUT

This application claims the priority of Federal Republic of Germany patent application no. 101 23 491.0, filed May 15, 2001, the disclosure of which is expressly incorporated by reference herein.

BACKGROUND AND SUMMARY OF THE INVENTION

The invention relates to an adjustable suspension strut for a motor vehicle and a method of adjusting a suspension strut.

DE 195 29 580 C2 describes an adjustable suspension strut that has a damping element. The damping element is enveloped by a helical spring and has a damping cylinder and a piston rod, which can be moved in and out in the damping cylinder. One end of the helical spring is braced on a first spring seat. Spaced apart from the first spring seat, a second spring seat is fastened to the piston rod. Thus, the second spring seat automatically follows the in and out movements of the piston rod. A first ring cylinder can be slid axially with a first guide surface on the damping cylinder. A second ring cylinder is arranged stationarily between the first ring cylinder and the damping cylinder. The first ring cylinder is guided with a second guide surface on a third guide surface of the second and/or internal ring cylinder. To adjust in the axial direction of the first ring cylinder there is a working chamber, whose volume can be changed and which is defined by at least the first and the second ring cylinder, whereby the different axial positions of the first ring cylinder are set by filling or emptying the working chamber. As a function of the fill quantity of a working medium in the working chamber, the first ring cylinder assumes an axial position on the damping cylinder. Since the first spring seat is fastened to the first ring cylinder, the overall length of the suspension strut can be varied.

Such adjustable suspension struts are usually used for level adjustment, that is to change the ground clearance of the vehicle. Another field of application is the position adjustment of a vehicle in order to achieve optimal handling performance even under varying road and driving conditions. To actuate the suspension struts of a vehicle, there is at least one valve unit, which connects the working chambers of the suspension struts to a tank or a pressure medium conveyor, for example a pump. To control the valve unit, there is a controller. The actuation of adjustable suspension struts is described, for example, in DE 42 31 641 A1.

One drawback with the suspension strut described above is that the control of the position and/or level adjustment is very expensive to operate.

Therefore, the object of the invention is to provide an adjustable suspension strut that enables a simplification of the control tasks.

This problem is solved with an adjustable suspension strut for a motor vehicle, which suspension strut is described hereinafter.

One of the advantages of the present invention is that the displaceability in the axial direction of both the first and the second ring cylinder enables a movement of one of the two ring cylinders in relation to the other ring cylinder, in particular for a hydraulically actuated position and/or level adjustment. In addition, both ring cylinders can be slid together in the axial direction on the damping element through manual adjustment of the adjusting element, thus achieving a manual change in the length of the suspension strut. In other words, the length of the suspension strut can be manually adjusted, and proceeding from this basic manual adjustment, the level and/or position can then be adjusted hydraulically. When the length of the suspension struts of a vehicle is set manually by a basic adjustment, the result for the vehicle is a defined and/or balanced starting position, so that the actuation for the position and/or level adjustment is easier to carry out than in the prior art.

A preferred embodiment is a simpler assembly of the suspension strut. In this embodiment it is also advantageous for the essentially conventional damping elements to be equipped with the two ring cylinders so that no fundamentally new construction of damping elements is necessary. Moreover, a modular construction, wherein the two ring cylinders can be retrofitted, as a prefabricated unit, on a damping element, is conceivable.

Other objects, advantages and novel features of the present invention will become apparent from the following detailed description of the invention when considered in conjunction with the accompanying drawings.

BRIEF DESCRIPTION OF THE DRAWINGS

The invention is explained in detail below with the aid of embodiments with reference to the drawings.

DETAILED DESCRIPTION OF THE DRAWINGS

Figure 1:
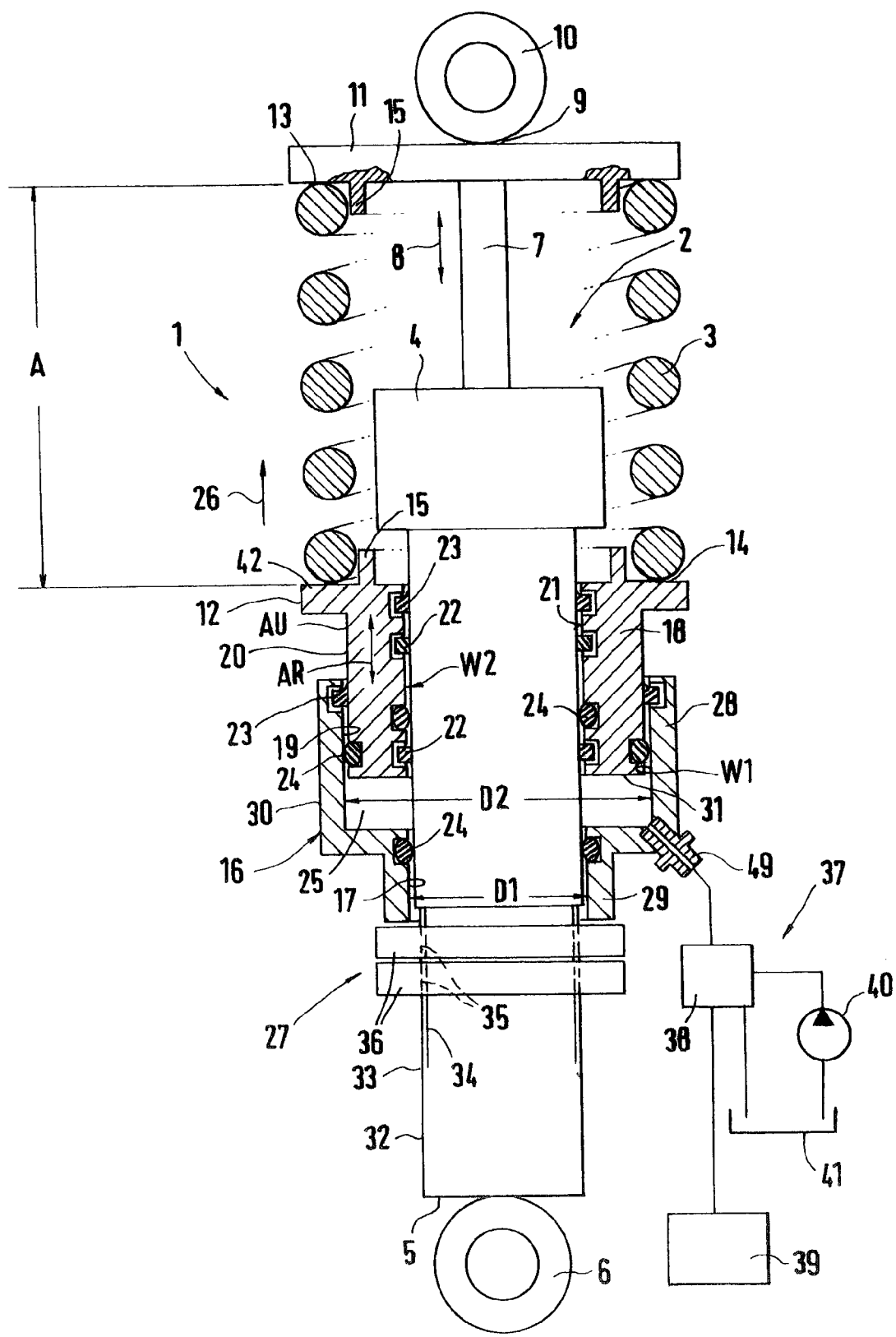
FIGS. 1 to 3 are broken out sections of an embodiment of an adjustable suspension strut.

FIG. 1 depicts an adjustable suspension strut 1 for a vehicle. The suspension strut 1 includes a damping element 2, which is enveloped at least area-by-area by a helical spring 3. The damping element 2 comprises a damping cylinder 4 having on its bottom area 5 a fastening element 6, in particular an annular eyelet. With the fastening element 6, the suspension strut 1 can be fastened, depending on the installation position, on the wheel side or on the body of the vehicle. Furthermore, the damping element 2 has a piston rod 7, which can be driven in and out (double arrow 8) in the axial direction in the damping cylinder 4. On the free end 9 of the piston rod 7 there is another fastening element 10, in particular an annular eyelet, which is connected, depending on the installation position of the suspension strut, to the vehicle body or on the wheel side. In addition, the damping element 2 has a first spring seat 11, which is fastened in the illustrated embodiment in the area of the free end 9 of the piston rod 7, preferably, adjacent to the fastening element 10. At a distance A from the first spring seat 11, there is a second spring seat 12 on the damping element 2. The helical spring 3 is arranged in such a manner between the spring seats 11 and 12 that its one end 13 rests on the first spring seat 11 and its second end 14 rests on the second spring seat 12. On at least one of the spring seats 11 or 12, here on both spring seats, there is a spring centering mechanism 15, which can be designed, for example, as a peripheral collar.

A first ring cylinder 16 can be slid axially with a first guide surface 17 on the damping cylinder 4. The first guide surface 17 is on the inside circumferential wall W1 of the first ring cylinder 16. Between the damping cylinder 4 and the first ring cylinder 16 there is a second ring cylinder 18, which can be slid axially directly on the damping cylinder 4. In the embodiment the second ring cylinder 18 is received at least partially by the first ring cylinder 16, so that the second ring cylinder 18 can be extended like a telescope out of the first ring cylinder 16. Thus, one of the ring cylinders can be displaced in the axial direction AR in relation to the other ring cylinder. The first ring cylinder 16 has for the guide of the second ring cylinder 18 a second guide surface 19, which is designed on the inside circumferential wall W1 of the first ring cylinder 16. The second guide surface 19 is assigned to a third guide surface 20, which is on the outside circumferential surface AU of the second ring cylinder 18. The second ring cylinder 18 is guided with a fourth guide surface 21 on the damping cylinder 4, whereby the fourth guide surface is formed by the inside circumferential wall W2 of the second ring cylinder 18. For an improved guide of the first and second ring cylinder 16 and 18, guide rings 22 can be disposed in the guide surfaces 17, 19, 20 and/or 21, whereby such guide rings 22 are provided only on the fourth guide surface in the embodiment. In addition, the guide surfaces 17, 19, 20 and/or 21 can exhibit oil control rings 23, whereby in the embodiment such oil control rings 23 lie in the second or third and on the fourth guide surface. Furthermore, sealing rings 24 can be inserted into the guide surfaces 17, 19, 20 and/or 21.

An annular working chamber 25 is defined by the damping cylinder 4 and the first and second ring cylinder 16 and 18. The volume of the working chamber 25 can be changed by the nesting of the first and second ring cylinder and their axial displaceability. If a working medium, preferably a hydraulic fluid, is introduced into the working chamber 25, the second ring cylinder 18 is displaced in the direction of the arrow 26 upwardly in the axial direction AR, and the second ring cylinder 18 is moved partially out of the first ring cylinder 16. Thus, a force is transferred by way of the helical spring 3 to the first spring seat 11 and thus to the piston rod 7, which is consequently moved out of the damping cylinder 4, whereby the entire length L of the suspension strut 1 is enlarged, which length is measured between the fastening elements 6 and 10. If the working chamber 25 is emptied, the second ring cylinder 18 drops, due to the weight of the vehicle, in the opposite direction to the direction of the arrow 26 in the axial direction AR into the first ring cylinder 16. In the filling and emptying process of the working chamber 25, the second ring cylinder 18 is moved in relation to the first ring cylinder 16, since the first ring cylinder 16 is braced against a stationary adjusting element 27, which can be moved manually intermittently and/or continuously in the axial direction. Thus, owing to the displacement in the axial direction AR of the adjusting element 27 both ring cylinders 16 and 18 are moved together, whereby the length L of the suspension strut 1 can be adjusted manually.

In the illustrated embodiment the first ring cylinder 16 is designed as a stepped cylinder 28 and has two inner steps 29 and 30, with different inside diameters D1 and D2. In this respect the inner step 29 has the smaller inside diameter D1, and the outer step 30 has the larger inside diameter D2. The first guide surface 17 is at the inner step 29 with the smaller diameter D1, and the second guide surface 19 is at the inner step 30 with the larger diameter D2. In particular it is provided that the first and the second guide surfaces are formed by means of the inside circumferential wall W1 of the inner steps 29 and 30. An annulus, in which the working chamber 25 lies, is defined by the inner step 30, the face side 31, and the cylindrical jacket 32. However, it is also conceivable that the first ring cylinder 16 has this annulus, and the second ring cylinder 18 is guided in this annulus and not on the damping cylinder 4.

In the embodiment, according to FIG. 1, the cylinder jacket 32 of the damping cylinder 4 is provided as the counter guide su face 33 for the first guide surface 17 of the first ring cylinder 16 and for the fourth guide surface 21 of the second ring cylinder 18. For the continuous displaceability of the adjusting element 27, the cylinder jacket 32 has an external thread 34 and the adjusting element 27 has an internal thread 35, whereby the adjusting element 27 can be formed by means of at least one ring element 36, which has the internal thread 35. Preferably, the adjusting element 27 has two ring elements 36, which are arranged in succession in the axial direction AR, and each of which exhibits an internal thread 35. By simultaneous rotation of the ring elements 16 on the damping cylinder 4, the adjusting element 27 can be displaced in the axial direction AR. If both ring elements 36 are rotated in opposite directions, the adjusting element 27 is locked along the line of a check nut in its axial position.

To supply the working chamber 25, there is a medium supply unit 37, which comprises at least one valve unit 38 and one controller 39 controlling the valve unit 38. Attached to the valve unit 38 is a pressure medium conveying device 40, in particular a pump, which conveys pressure medium from a tank 41 and passes it via the valve unit 38 into the working chamber 25. The valve unit 38 is also attached to the tank 41 so that the working chamber 25 can be emptied via the valve unit 38 into the tank 41. Thus, the valve unit 38 exhibits at least two switching positions, whereby in one switching position the working chamber 25 is connected to the pressure medium conveying device 40 and in another switching position the working chamber 25 is connected to the tank 41. Thus, an inflow and a return flow are formed for the working chamber 25. Optionally the valve unit can assume a third switching position, in which the working chamber 25 is closed. Depending on the fill volume of the working chamber 25, the results are varying axial positions of the second ring cylinder 18 in relation to the first ring cylinder 16 so that the length L of the suspension strut 1 can be varied through hydraulic actuation.

In the embodiment, according to FIG. 1, the second spring seat 12 is made as one piece with the second ring cylinder 18 and is provided in particular on its face side 42, which is opposite the face side 31 and which can also have the spring centering mechanism 15.

Figure 2:
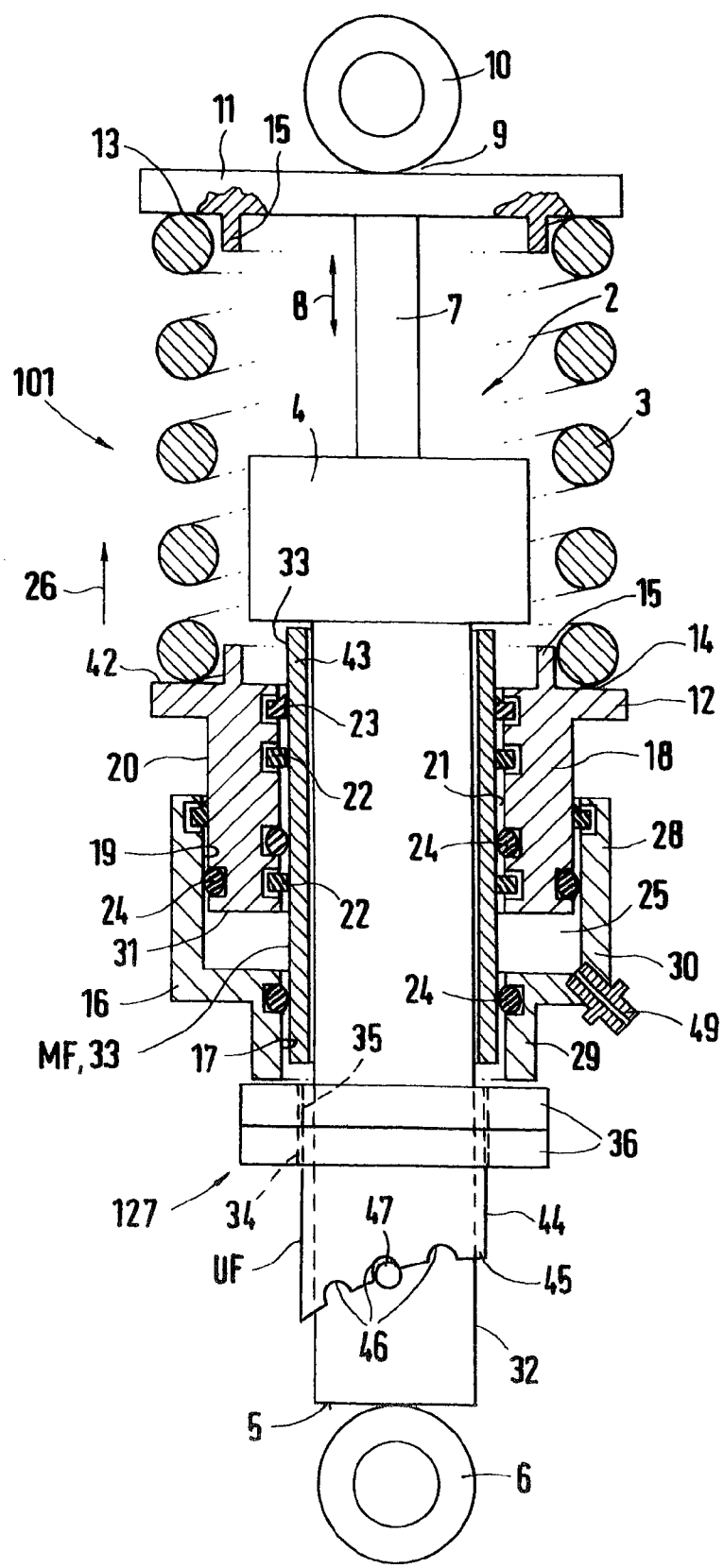

In the embodiment, according to FIG. 2, of a suspension strut 101, the damping cylinder 4 has a guide sleeve 43, which envelops at least area-by-area the cylinder jacket 32. In this embodiment the outer jacket MF of the guide sleeve 43 has the counter guide surface 33, on which the first guide surface 17 of the first ring cylinder 16 and the fourth guide surface 21 of the second ring cylinder 18 come to rest. Thus, the two ring cylinders 16 and 18 are guided indirectly on the damping cylinder 4.

At variance with the embodiment according to FIG. 1, one adjusting element 127 can be displaced stepped in the axial direction AR. To this end, the adjusting element 127 has an adjusting sleeve 44, which can be rotated and slid on the cylinder jacket 32. The adjusting sleeve 44 has on its sleeve end, facing away from the first ring cylinder 16, an inclined end region 45, on which are formed locking slots 46, which have open edges and are spaced apart in the circumferential direction. At least one stop projection 47, which comes to rest, depending on the rotating position of the adjusting sleeve 44, in one of the locking slots 46, is provided or fastened on the cylinder jacket 32 of the damping cylinder 4. Depending on which locking slot 46 the stop projection 47 lies in, the adjusting element 127 is moved in the axial direction AR on the damping cylinder 4. Of course, it is also conceivable to use, in place of the adjusting element 127, the adjusting element 27 with the two ring elements 36 at the suspension strut 101 with the guide sleeve 43. However, it is also possible to provide the guide sleeve 43 for the suspension strut 1, according to FIG. 1. Furthermore, it is also conceivable to design an external thread, on which at least one of the ring elements 36 is screwed, on the outer circumferential surface UF of the adjusting sleeve 44, so that in this embodiment both a stepped adjustment with the aid of the locking slots 46 and the stop projection 47 and also a stepless displaceability of the adjusting element 47 by way of the internal and external thread 34 and 35 is possible.

Figure 3:
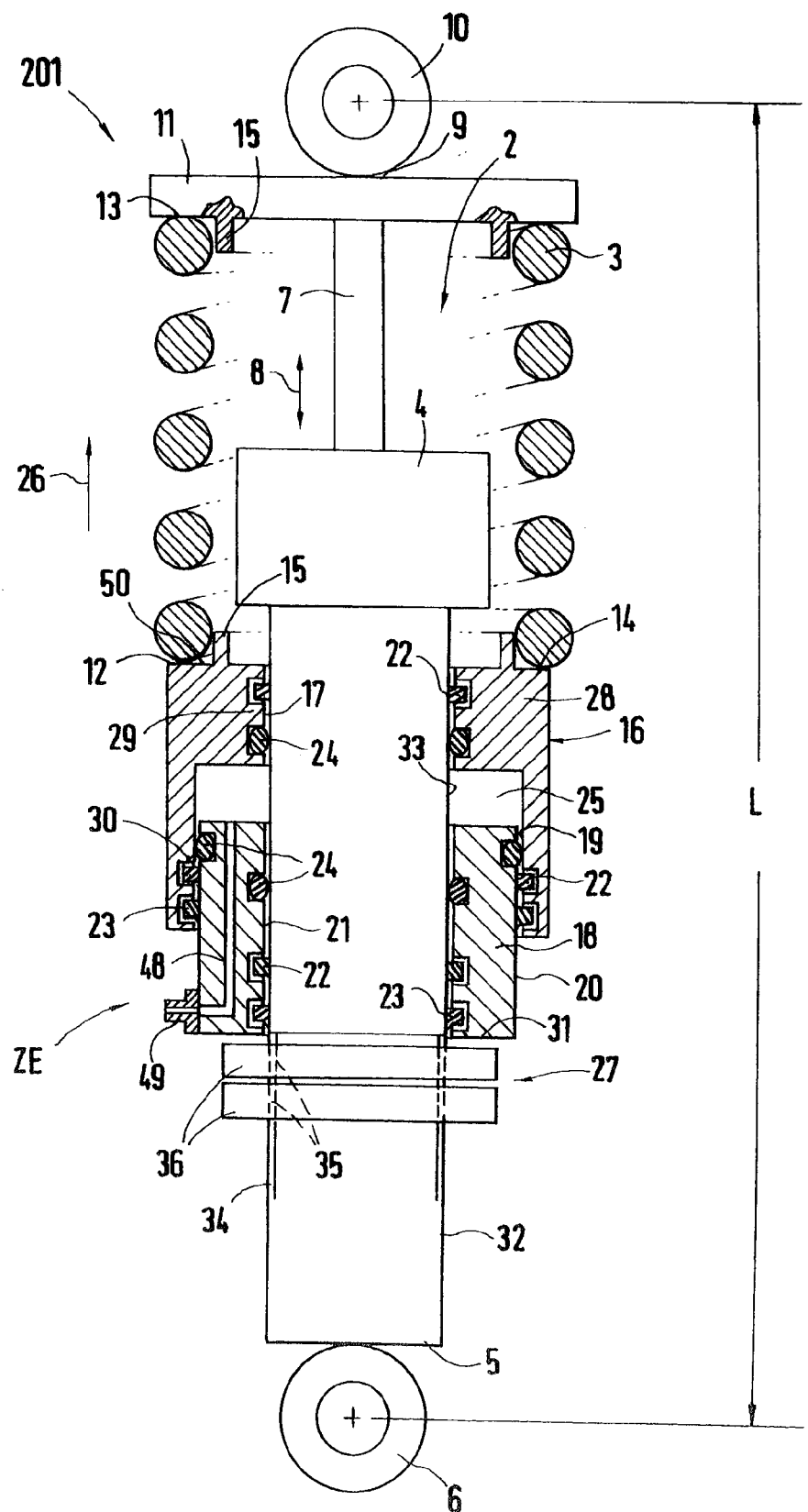

In the embodiment of a suspension strut 201, according to FIG. 3, the cylinder unit ZE, constructed from the first and second ring cylinder 16 and 18, is disposed head first on the damping cylinder 4. That is, the second ring cylinder 18 is now braced with a face side 31 against the adjusting element 27, and the first ring cylinder 16 can be displaced in relation to the second ring cylinder 18 in the axial direction AR in and opposite to the direction of the arrow 26 through pressurization of the working chamber 25. In the case of this suspension strut 201 guide rings 22 are provided preferably between the cylinder 32 and the first guide surface 17 and between the second and third guide surface 19, 20. The helical spring 3 is braced with its one end 14 against the second spring seat 12, which is designed now on the first ring cylinder 16 and which is present on the face side 50, which faces away from the working chamber 25 and which belongs to the first ring cylinder 16.

For the pressure medium supply of the working chamber 25 there is a pressure medium channel 48 (FIG. 3) in the second ring cylinder 18. The pressure medium channel 48 is connected to a pressure medium connection 49, which is connected to the valve unit 38. In the embodiment, according to FIG. 1, the pressure medium connection 49 is provided at a first ring cylinder 16 of the suspension strut 1.

Of course, the suspension strut 201 shown in FIG. 3 can have, in place of the continuously adjustable adjusting element 27, the intermittently adjustable adjusting element 127 shown in FIG. 2, or the combination of the continuously and intermittently adjustable adjusting element.

On the basis of the stepless or stepped adjustment of the adjusting element 27 or 127, the suspension strut 1 can be moved into a basic length or basic adjustment, in which the effective or entire length L of the suspension struts 1, 101 or 201 of a vehicle can be adjusted the same or identically or coordinated with each other.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An adjustable suspension strut for a motor vehicle, comprising:
   a string having first and second ends;
   a damping element including:
      a damping cylinder, and
      a piston rod movably disposed in the damping cylinder, the first end of the spring being connected to the piston rod;
   a first ring cylinder axially slidable relative to the damping cylinder;
   a second ring cylinder disposed between the damping cylinder and the first ring cylinder, the second ring cylinder being axially slidable relative to the damping cylinder, wherein the second end of the spring is disposed on one of the ring cylinders;
   a working chamber defined by at least the first and second ring cylinders, wherein the two ring cylinders are axially displaced relative to each other; and
   an adjusting element configured to adjust the relative position between the damping element and the other of the first and the second ring cylinders, wherein the adjusting element comprises an adjusting sleeve that is rotatable and axially slidable on the damping cylinder and has an inclined end region, the inclined end region having locking slots, and the damping cylinder has a stop projection, which interacts with the locking slots to adjust the relative axial position between the adjustment element and the damping cylinder, and wherein the adjusting element further includes a ring element having an internal thread, and the adjusting sleeve has an external thread for engagement with the internal thread of the ring element for the axial displacement of the ring element relative to the adjusting sleeve.

2. The adjustable suspension strut of claim 1, wherein the adjustment element is manually adjustable in one of continuous and stepwise manners.

3. The adjustable suspension strut of claim 1, wherein the first ring cylinder includes a stepped cylinder and has two inner steps with different diameters, wherein the inner step with the smaller diameter has a first guide surface and the inner step with the larger diameter has a second guide surface, the first ring cylinder being axially slidable with the first guide surface on the damping cylinder, wherein the second ring cylinder has a third guide surface, the first ring cylinder is guided with the second guide surface on the third guide surface of the second ring cylinder, wherein the second ring cylinder has an internal circumferential wall including a fourth guide surface with which the second ring cylinder is axially displaceable on the damping cylinder, and wherein the working chamber is defined by the first and second ring cylinders and the damping cylinder.

4. The adjustable suspension strut of claim 1, wherein one of the first and second ring cylinders comprises a pressure medium connection for the supply to the working chamber of pressure medium for the relative displacement between the first and second ring cylinders.

5. An adjustable suspension strut for a motor vehicle, comprising:
   a spring having first and second points;
   a damping element including:
      a damping cylinder, and
      a piston rod movably disposed in the damping cylinder;
   an automatic adjusting element; and
   a manual adjusting element connected in series to the automatic adjusting element, the first point of the spring being connected to one of the damping cylinder and piston rod, the second point of the spring being connected to one of the manual and automatic adjusting elements wherein the position of the second point of the spring is adjusted, in series, by the manual and automatic adjusting elements, wherein the first and second points of the spring are first and second ends of the spring, the first end of the spring being connected to the piston rod, and the automatic adjusting element includes:
      a first ring cylinder axially slidable relative to the damping cylinder;
      a second ring cylinder disposed between the damping cylinder and the first ring cylinder, the second ring cylinder being axially slidable relative to the damping cylinder; and a working chamber defined by at least the first and second ring cylinders, wherein the two ring cylinders are axially displace relative to each other, wherein the second end of the spring is disposed on one of the ring cylinders, and wherein the manual adjusting element configured to adjust the relative position between the damping cylinder and the other of the first and the second ring cylinders, wherein the manual adjusting element comprises an adjusting sleeve that is rotatable and axially slidable on the damping cylinder and has an inclined end region, the inclined end region having locking slots, and to adjust the relative axial position between the manual adjustment element and the damping cylinder, and wherein the manual adjusting element further includes a ring element having an internal thread, and the adjusting sleeve has an external thread for engagement with the internal thread of the ring element for the axial displacement of the ring element relative to the adjusting sleeve.

6. The adjustable suspension strut of claim 5, wherein the manual adjusting element is adjustable in one of continuous and stepwise manners.

7. The adjustable suspension strut of claim 5, wherein the first ring cylinder includes a stepped cylinder and has two inner steps with different diameters, wherein the inner step with the smaller diameter has a first guide surface and the inner step with the larger diameter has a second guide surface, the first ring cylinder being axially slidable with the first guide surface on the damping cylinder, wherein the second ring cylinder has a third guide surface, the first ring cylinder is guided with the second guide surface on the third guide surface of the second ring cylinder, wherein the second ring cylinder has an internal circumferential wall including a fourth guide surface with which the second ring cylinder is axially displaceable on the damping cylinder, and wherein the working chamber is defined by the first and second ring cylinders and the damping cylinder.

8. The adjustable suspension strut of claim 5, wherein one of the first and second ring cylinders comprises a pressure medium connection for the supply to the working chamber of pressure medium for the relative displacement between the first and second ring cylinders.

* * * * *